United States Patent [19]

Taylor

[11] Patent Number: 4,864,818
[45] Date of Patent: Sep. 12, 1989

[54] AUGMENTOR LINER CONSTRUCTION

[75] Inventor: James J. Taylor, Jensen Beach, Fla.

[73] Assignee: United Technologies Corporation, Hartford, Conn.

[21] Appl. No.: 178,691

[22] Filed: Apr. 7, 1988

[51] Int. Cl.$^4$ .............................................. F02K 3/10
[52] U.S. Cl. ...................................... 60/261; 60/39.32
[58] Field of Search ............... 60/39.31, 39.32, 752, 60/754, 261, 270.1

[56] References Cited

U.S. PATENT DOCUMENTS

| | | | |
|---|---|---|---|
| 2,874,536 | 2/1959 | Benson et al. | 60/261 |
| 2,936,978 | 5/1960 | Lauck | 60/39.31 |
| 3,038,309 | 6/1962 | Waters | 60/39.32 |
| 3,459,460 | 8/1969 | Kopp | 60/39.32 |
| 3,712,062 | 1/1973 | Nash | 60/261 |
| 3,826,088 | 7/1974 | Nash et al. | 60/261 |

Primary Examiner—Louis J. Casaregola
Attorney, Agent, or Firm—Edward L. Kochey, Jr.

[57] ABSTRACT

An augmentor liner 16 for a gas turbine engine is formed of thin perforated material and has pressurized cooling air surrounding it. A stiffner ring 42 is supporter from the liner with radially flexible straps 52, while relative radial displacement is limited by clips 50, 44. The liner is restrained from buckling while permitting thermal expansion.

5 Claims, 2 Drawing Sheets

AUGMENTOR LINER CONSTRUCTION

The Government has rights in this invention pursuant to a contract awarded by the Department of the Air Force.

TECHNICAL FIELD

The invention relates to gas turbine engines for aircraft and in particular to support of a thermal protection liner in an augmentor.

BACKGROUND OF THE INVENTION

An augmentor of a gas turbine engine forms an additional combustion chamber for afterburning in the gas turbine exhaust. Extremely high gas temperatures exist which would severely damage the gas flow confining duct.

It is therefore known to provide thermal liners within the augmentor duct to protect the duct from these excessive temperatures. The liner itself must be cooled and accordingly cooling air is supplied between the liner and duct for convection cooling of the liner, and also for passing a portion of the air through perforations in the liner to provide additional cooling.

The material of these liners is very thin, on the order of 0.6 millimeters, to minimize weight and avoid stresses during thermal transients. Despite the cooling, these liners operate at high temperature.

The cooling air supplied externally of these liners is at a higher pressure than the gas within the liner and accordingly, an external pressure is exerted on this liner. This creates a tendency for the liner to collapse or buckle under the external loading.

Since the liner may operate on the order of 600 degrees C hotter than the surrounding duct it expands realtive thereto. Any restraint imposed on this expansion also causes a buckling tendency in the liner. When operating at high temperature, the creep strength of the material drops off and there is a tendency for the liner to sag over time.

It is known to support the liner from axial movement at the upstream end and to guide the liner at the downstream, thereby permitting longitudinal expansion of the liner with respect to the surrounding duct. Rings have been located in the cooling air stream around the liner to provide support from buckling. These rings have been secured to the liner with a truss-like arrangement. During expansion of the liner the strain is locked in the liner by the external restraint, with this sometimes leading to local buckling and possible tearing of the liner.

SUMMARY OF THE INVENTION

A cylindrical liner of thin perforated material is supported within an augmentor duct from one end in a conventional manner. Stiffner rings surround the duct and are spaced from the outer surface of the liner. A plurality of Z straps are secured to both the ring and the liner extending in the same direction at an acute angle with respect to these members. The end of the Z strap secured to the ring is arranged to form an inwardly extending clip. The liner has an outwardly extending clip attached which engages the first clip in a radial lost motion manner which permits outward movement of the liner with respect to the duct but limits any gross inward movement of the liner with respect to the duct.

The engaging clips between the ring and the liner limit the amount of sag which can occur and limit the possibility of gross buckling of the liner. The Z straps fuction to deter initial buckling of the liner and hold the ring at the proper axial location despite the high velocity of air flow passing thereover.

DESCRIPTION OF THE PREFERRED EMBODIMENT

Figure 1:
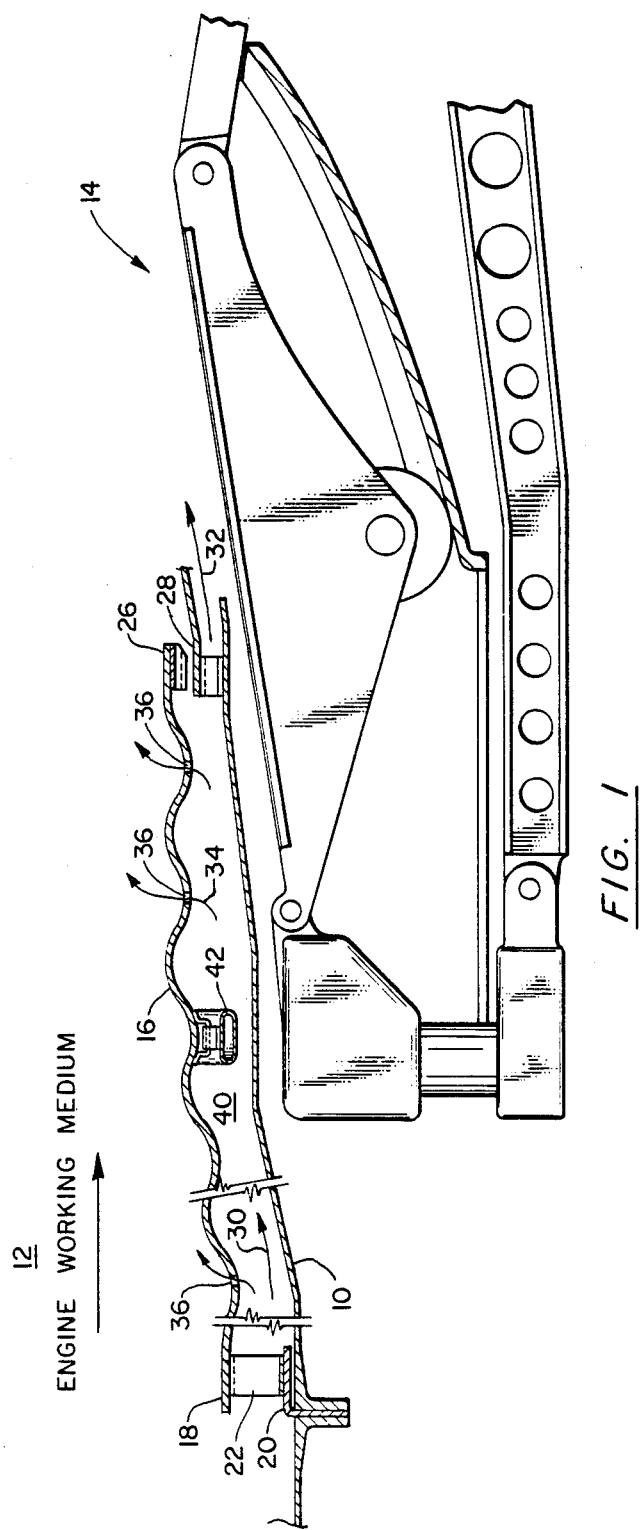
FIG. 1 is a partial section showing the location of the liner in the duct.
Figure 2:
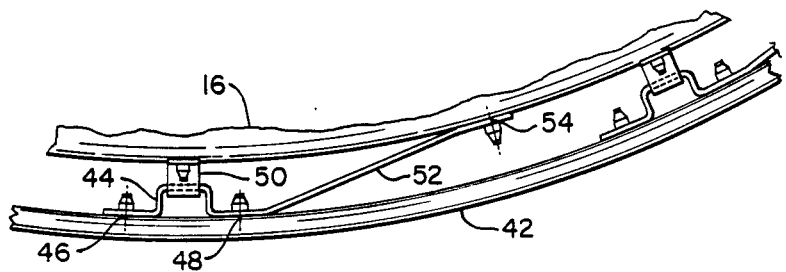
FIG. 2 is a partial elevation of the support.
Figure 3:
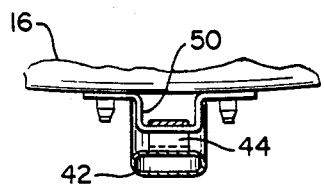
FIG. 3 is a partial sectional view of the support.
Figure 4:
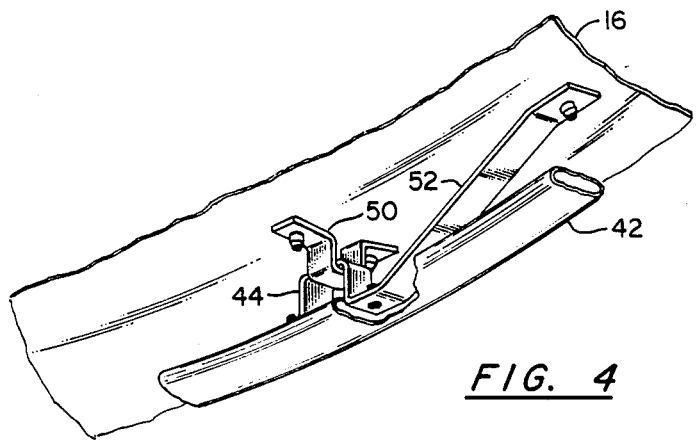
FIG. 4 is an isometric view of the support.

An augmentor duct 10 is arranged to convey hot gas 12 within an augmentor to discharge nozzle arrangement 14. A thermal liner 16 is provided to protect augmentor duct 10 from the high temperatures.

This liner is supported at the upstream end 18 in a manner to restrict axial movement of the liner. A bent ring 20 supports the upstream end 18 by a plurality of plate supports 22. These supports are formed in pairs, each of the pair being oppositely directed about 45 degrees from the ring and liner, forming a relatively rigid truss-like structure. Location 18 is upstream of the augmentor fuel nozzle. The liner temperature at this point is only 370 degrees C with the support ring at 260 degrees C. Differential expansion caused by this 90 degree C difference is readily restrained.

Downstream of the support after the fuel nozzle the liner operates at about 900 degrees C. Considerable differential expansion occurs between liner 16 and duct 10. The downstream end 26 is slidable within guide support 28 permitting longitudinal movement of this end of the liner while limiting radial movement.

Cooling air flow 30 has passed between the liner and the duct with a portion 32 exiting at the far end and another portion 34 passing through a multiplicity of small openings 36 in the perforated liner.

Liner 16 is about 0.6 millimeters thick and about 1 meter in diameter. It is corrugated with circumferentially extending axially spaced corrugations which provide an initial stability of the liner against buckling.

The restriction near the outlet where air flow 32 is passed is sufficient to maintain pressure within annular space 40 at a level to provide the desired flow through openings 36. This would normally be in the order of 0.7 kilo pascals per square centimeter (10 psi). This external pressure creates a tendency for buckling of the liner.

Accordingly, at several locations there is located a stiffner ring 42 within annular space 40. This ring may be of any shape preferably with a large moment of inertia resisting bending, and preferably of a shape that is somewhat streamlined since the velocity of the cooling air passing thereover may be on the order of Mach 0.3. This ring has thereon an inwardly extending chip 44 fastened to the ring at circumferentially spaced locations 46 and 48. A second clip 50 is secured to the liner 16 engaging the first clip in a lost motion connection.

The liner being 600 degrees centigrade hotter than the duct 10 will expand approximately 2.5 millimeters on the radius and accordingly sufficient clearance must be left in the lost motion connection to permit radial growth of the liner with respect to the ring. In the cold condition these two may be in contact, while in the hot condition there will be something on the order of 2.5 millimeter clearance between the two.

The interaction between these two clips will limit sagging permitted by creep of the material under gravity forces and will limit any gross buckling that starts to occur. During impact loading, such as landing of the aircraft, the liner deflects between the end supports. At intermediate locations the stiffener ring 42 strikes duct 10, and the clips operate to limit deflection of the liner 16.

Associated with each of the first clips 44 is a strap 52 secured to liner 16 at location 54 while its extension forming the clip itself is connected to the ring at locations 46 and 48. This strap extends at an acute angle with respect to both the liner 16 and the ring 42. As the liner expands relative to the ring, the flexibility of these straps as a cantilever permits the liner end to move outwardly and the liner to rotate slightly with respect to the ring. Appropriate clearance must be left between clips 44 and 50 to permit this.

In order for the liner to buckle, there must be some circumferential movement at several locations. The substantial circumferential component of these straps tends to deter such movement by compressive force on the strap and thereby deter buckling. Should this fail, however, the interlocking clips operate as a backup to preclude gross buckling.

Stiffner ring 42 is exposed to high velocity air flow passing through the cooling duct 40. This would tend to push the ring toward the discharge end and the interlocking clips toward an extreme position where they would jam, vibrate and ultimately wear. While strap 52 has a single connection 54 to the liner, it is connected at two circumferentially spaced locations 46 and 48 to the ring. Accordingly, the strap will supply a resisting bending moment to prevent axial movement of the ring. If desired, the spaced connections could be placed on the liner instead of the ring, or as well as the ring, to effect the same function.

During long term operation at high temperature, the liner may sag so that the hot clearance between the clips is lost on one side of the liner. On cooling down, some force would be established between the clips. This force, however, being in an outward direction would not cause buckling and will simply pull the liner albeit with some strain back to its normal position.

I claim:

1. An augmentor liner for a gas turbine engine having a pressurized supply of cooling air to the exterior of said liner comprising:
   a cylindrical liner of thin perforated material;
   at least one stiffner ring surrounding and spaced from the outer surface of said liner;
   a plurality of straps, each secured to both said ring and said liner and circumferentially extending at an acute angle with respect to both said ring and said liner, each of said straps extending in the same direction and being secured to at least one of said ring and said liner by circumferentially spaced connections; and
   a plurality of lost radial motion connectors between said liner and said ring.

2. An augmentor liner as in claim 1:
   said liner having a plurality of longitudinally spaced circumferential corrugations.

3. An augmentor liner as in claim 1:
   each of said lost motion connections comprising:
   first clips rigidly secured to said ring interior;
   second clips rigidly secured to said liner exterior;
   each of said first and second clips radially engaged to limit inward movement of said liner with respect to said ring; and
   said first and second clips when at the same temperature having clearance for radially outward movement of said liner with respect to said ring, and a clearance for rotational movement of said liner with respect to said ring in the direction from a point securing said strap to said ring to a point securing said strap to said liner.

4. An augmentor liner as in claim 3:
   each of said first clips being an extension of one of said straps.

5. An augmentor liner as in claim 4:
   each of said straps being joined in said ring at two circumferentially space locations.

* * * * *